United States Patent
Karppa et al.

(10) Patent No.: US 9,903,491 B2
(45) Date of Patent: Feb. 27, 2018

(54) EXPLOSION VENT

(71) Applicant: ABB Technology Oy, Helsinki (FI)

(72) Inventors: Jaani Karppa, Helsinki (FI); Tuomo Kinnunen, Helsinki (FI); Pirkka Myllykoski, Helsinki (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 15/076,054

(22) Filed: Mar. 21, 2016

(65) Prior Publication Data

US 2016/0273670 A1    Sep. 22, 2016

(30) Foreign Application Priority Data

Mar. 20, 2015    (EP) ..................................... 15160120

(51) Int. Cl.
*F16K 17/04*    (2006.01)
*F16K 17/36*    (2006.01)
*E04B 1/98*    (2006.01)
*F42B 39/20*    (2006.01)
(Continued)

(52) U.S. Cl.
CPC ................ *F16K 17/36* (2013.01); *A62C 3/00* (2013.01); *E04B 1/98* (2013.01); *F16K 17/0413* (2013.01); *F16K 17/0493* (2013.01); *F42B 39/20* (2013.01); *B64C 2001/009* (2013.01)

(58) Field of Classification Search
CPC .. F16K 17/36; F16K 17/0493; F16K 17/0413; A62C 3/00; E04B 1/98; F42B 39/20; B64C 2001/009

USPC ........ 137/68.19, 232, 233, 315.33, 511, 522, 137/523, 535, 43, 68.17, 69, 467, 469, 137/843, 860, 587; 251/143, 157, 174, 251/333, 336, 337, 338
See application file for complete search history.

(56) References Cited

U.S. PATENT DOCUMENTS 131,073 A * 9/1872 Woodward .......... F16K 17/0413
                                                    137/535
892,886 A * 7/1908 Prest .................. B65D 51/1661
                                                    137/535
(Continued)

FOREIGN PATENT DOCUMENTS

DE    102011107984 A1    1/2013
EP    1659360 A1    5/2006
EP    2009386 A1 *    12/2008    .............. F42B 39/20

OTHER PUBLICATIONS

European Search Report; dated Sep. 7, 2015; European Application No. 15160120; ABB Technology Oy.

*Primary Examiner* — Minh Le
(74) *Attorney, Agent, or Firm* — Taft Stettinius & Hollister LLP

(57) ABSTRACT

An explosion vent mounted to seal an opening formed on a wall of a closed space comprises a cover being dimensioned to fit on said opening and having a perimeter with an edge adapted to seal the cover against the opening with a sealing element. A spring element is arranged to hold the cover in the opening and the spring element has a direction of spring action. The cover is held by opposite retaining surfaces in the opening and the cover and he retaining surfaces are acting against the spring action of element. The sealing element is positioned against the opening so that the sealing force is directed at least partially crosswise to the direction of the spring action of the spring element.

4 Claims, 2 Drawing Sheets

(51) Int. Cl.
*A62C 3/00* (2006.01)
*B64C 1/00* (2006.01)

(56) References Cited

U.S. PATENT DOCUMENTS

| | | | | |
|---|---|---|---|---|
| 1,291,497 A | * | 1/1919 | Harris | F16K 17/0413 110/173 B |
| 1,827,100 A | * | 10/1931 | Pardee | A61J 9/04 137/535 |
| 2,355,485 A | * | 8/1944 | Tinnerman | F16B 21/20 220/327 |
| 3,131,718 A | * | 5/1964 | Mingrone | F16K 17/02 137/512.1 |
| 3,295,324 A | * | 1/1967 | Conard | F02K 9/34 102/377 |
| 3,516,870 A | * | 6/1970 | Horn | H01M 2/1276 220/203.27 |
| 3,874,241 A | * | 4/1975 | Harland | G01L 7/04 73/431 |
| 4,674,530 A | * | 6/1987 | Bickford | B65D 90/32 137/469 |
| 4,899,960 A | | 2/1990 | Hararat-Tehrani et al. | |
| 5,141,020 A | | 8/1992 | Sunderhaus et al. | |
| 5,261,450 A | * | 11/1993 | Betts | F16K 17/0433 137/514.7 |
| 5,346,373 A | * | 9/1994 | Riffe | F04B 39/0005 137/535 |
| 6,796,260 B1 | * | 9/2004 | Barker | B63G 3/02 114/238 |
| 8,783,285 B2 | * | 7/2014 | Kulesha | F16K 31/002 137/522 |
| 8,833,591 B2 | * | 9/2014 | Kotevski | F42B 39/20 206/3 |
| 9,435,173 B2 | * | 9/2016 | Woods | F16K 15/046 |
| 9,488,291 B2 | * | 11/2016 | Kulesha | F16K 31/025 |
| 2008/0251135 A1 | * | 10/2008 | Southam | F16K 1/302 137/454.2 |

* cited by examiner

EXPLOSION VENT

TECHNICAL FIELD

The present invention concerns venting explosion pressure from a closed space in a controlled manner.

Especially the invention concerns a vent for forming a liquid and/or gas tight closure for controlled relief of pressure from a closed space such as instrument cabinets and the like.

BACKGROUND

Overpressure conditions can lead to a variety of disasters—injuries, damaged equipment, business interruptions and downtime. An explosion can result from an ignition of a combustible gas, mist or dust when mixed with air during processing, handling or storage operations. In closed spaces containing electrical apparatus an explosion may be caused by an electric arc initiated by damage or failure of the apparatus or circuitry. At explosion, a rapid rise in pressure occurs in the containing structure, and if it is not of adequate strength to withstand the deflagration pressure, extensive damage and injury to personnel can occur. For these reasons it is paramount to provide controlled pressure release for spaces where a danger for explosion exists.

When an explosion is vented, the overpressure built up in closed space like cabinets or the plant itself is directly vented to the outside or any desired safe direction. This protects plants and containers from possible shock waves that, in turn, could cause complete destruction.

Controlled venting of a closed space can be accomplished by an opening formed on a wall of a cabinet or other closed space and closing it by a cover. The cover extends over the edges of the opening and a seal is placed around the opening in order to achieve desired tightness for fluids like gases and liquids. The cover may be attached to the cabinet wall by screws. The cover is dimensioned to rupture under specific pressure and when ruptured, it forms a venting hole for pressurized substances within the cabinet.

An alternative solution is to make a weakened or relieved area on the structure of the closure. This is used especially for cast frames and bodies wherein a wall section that is thinner than load bearing walls is placed in a suitable location.

One alternative is to form an opening in the structure and close that by a rubber plug that is formed to fit in the hole and close it tightly.

Explosion venting becomes also possible when special explosion protection panels (bursting discs) are installed. A bursting disc (also known as a rupture disc or bursting disk), is designed to provide a leak-tight seal within a pipe or vessel, until the internal pressure rises to a predetermined level. At that point the bursting disc ruptures, preventing damage to the equipment from overpressure. This type of explosion vents are low burst pressure membranes of calculated area fixed over an opening on the structure to be protected. In the event of a deflagration the vents provide a rapid and unrestricted opening at a predetermined burst pressure (Pstat) allowing combustion gases to expand and flow through the open vent. The required relief area necessary to protect plant or equipment may be determined by using the most current standards of NFPA 68 or VDI 3673.

SUMMARY OF INVENTION

Above mentioned known solutions have some drawbacks. Weakened covers or bursting disks may be damaged by forces from outside. If a cover is not weakened, the rupture has to occur in the structure of the cover or at the threads of the mounting screws. This may require much higher force than desired and lead to damages caused by overpressure. A relieved wall may cause challenges for designing a cast structure. The frame or chassis has to be usually at least water tight also at the relief. For example, in cast iron structures made by sand casting 5-6 mm wall thickness is required to guarantee water tightness. Such a structure requires high force to rupture controllably. If the quality requirements for the product are high, the relief must he formed inside the cast. This causes challenges in cast structures especially when the chassis is cup like.

A rubber plug may be pushed inside the structure. It also needs a protective cover against water jets in order to fulfill requirements of IP69K.

The Ingress Protection (IP) rating system is an internationally recognized scale that relates to proven protection against environmental factors such as liquids and solids.

Ingress protection ratings can be identified by the letters IP, followed by two numbers. These numbers define the amount of protection against specified elements and its ability to resist foreign matter that could otherwise get inside the product and cause it to fail. The IP69K rating provides protection against ingress of dust and high temperature, high pressure water.

For the above reasons, it would be beneficial to provide an improved pressure vent In a first aspect, the invention relates to a pressure vent that can be tightly sealed over an opening and provides controlled pressure relief through the opening.

An aspect of one embodiment of the invention is to provide a pressure vent that fulfills the requirements of ingress protection rating IP69K.

One embodiment of the invention provides pressure relief on a desired pressure level.

According to other aspects and embodiments of the present invention, the invention provides a pressure vent that is simple, easy to manufacture and mount.

The invention is based on a cover having a perimeter edge and a sealing element on the perimeter edge, the cover and sealing element being dimensioned to fit sealingly on an opening, and a spring element for holding the cover in the opening.

According to one embodiment, the opening has a surface facing towards the center of the opening and the sealing element of the cover is mounted to cause a sealing force against that surface.

According to one embodiment, the sealing force is directed at least partially crosswise, preferably perpendicular, to the opening direction of the cover and the spring is positioned to cause a force that is opposite to the opening direction of the cover.

According to one embodiment of the invention, the cover has a first surface on its perimeter edge for accommodating the sealing element and a second surface extending outwards from the first surface and forming a flange having larger dimensions than the first surface.

According to one embodiment of the invention, the at least one spring is attached on the cover on a surface that is opposite side of the cover in relation to the flange.

According to one embodiment of the invention, the explosion vent includes means for preventing the rotation of the cover in the opening.

According to one embodiment of the invention, the spring element is at least one leaf spring extending over the perimeter of the cover.

The embodiments of the invention provide essential benefits.

The explosion vent according to the embodiments of the invention has a very simple structure, includes only few parts and is cheap to manufacture and easy to install. The force required for opening the vent can be adjusted easily be changing the properties of the spring that holds the cover in place. The force is not dependent of thickness or strength of the wall or fastening elements such as screws. The explosion vent doesn't affect the strength of the wall structure and it withstands well forces directed to it from outside the closure. The cover may be dimensioned so that there is no danger of accidental puncture from outside. As the cover may be mounted flush with the surface of a wall, it doesn't affect the appearance of the wall and doesn't from any harmful protrusions on the surface. The cover needs only minimum space for opening.

The invention enables designing explosion vents for IP classes IP67 and IP69K.

Other objects and features of the invention will become apparent from the following detailed description considered in conjunction with the accompanying drawings. It is to be understood, however, that the drawings are intended solely for purposes of illustration and not as a definition of the limits of the invention, for which reference should be made to the appended claims.

DESCRIPTION OF EMBODIMENTS

Definitions:

Inside of a wall or closed space is the side of a wall from which an overpressure is to be released by the vent.

Outside is the side of the wall onto which the overpressure is to be released.

An explosion is herein used to describe actual explosions and any sudden increase of pressure in a space that may cause similar damage as an explosion.

A closed space may be, for example an instrument cabinet, closed chassis of an apparatus or a room.

The purpose of the explosion vent is to open in specific, defined circumstances and provide pressure release to a predetermined safe direction. In a liquid or gas tight (fluid tight) structures the vent may not open unintentionally and the vent has to be tight according to specifications set to the structure in question. The seal of the present explosion vent is designed so that opening of the vent doesn't require high force and the force required can be easily adjusted to a desired level. The sealing force and action is caused by a force (compression of the seal element) that has a direction different to that of the force required for opening and holding the vent cover on place. The required tightness, for example the required IP class, may be obtained simply by a standard O-ring and a labyrinth structure combined thereto. The labyrinth provides the required protection for pressurized water.

Figure 1:
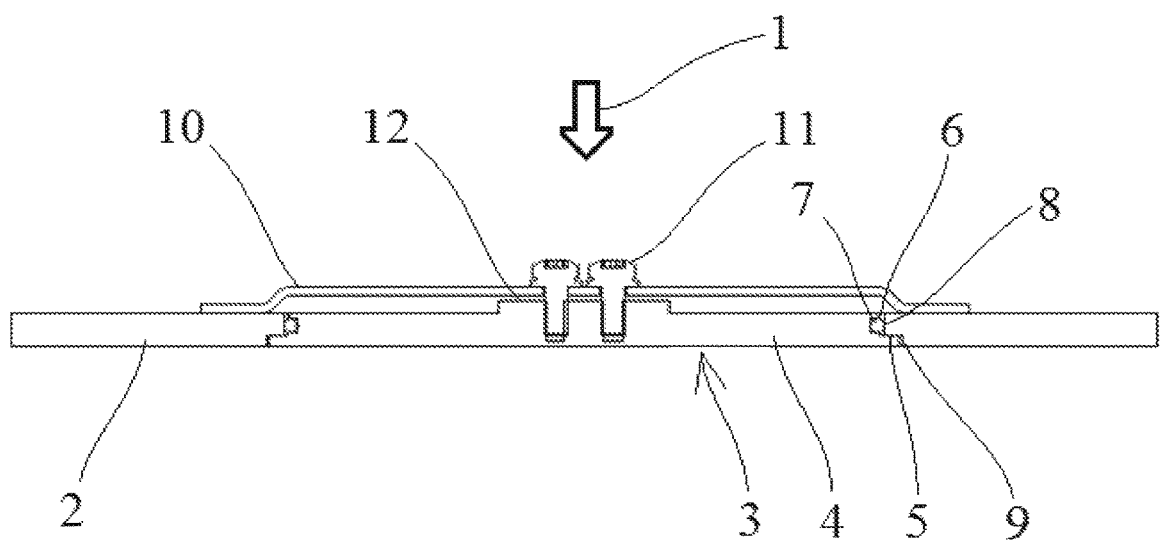
FIG. 1 shows a cross section of one embodiment of the invention.
Figure 2:
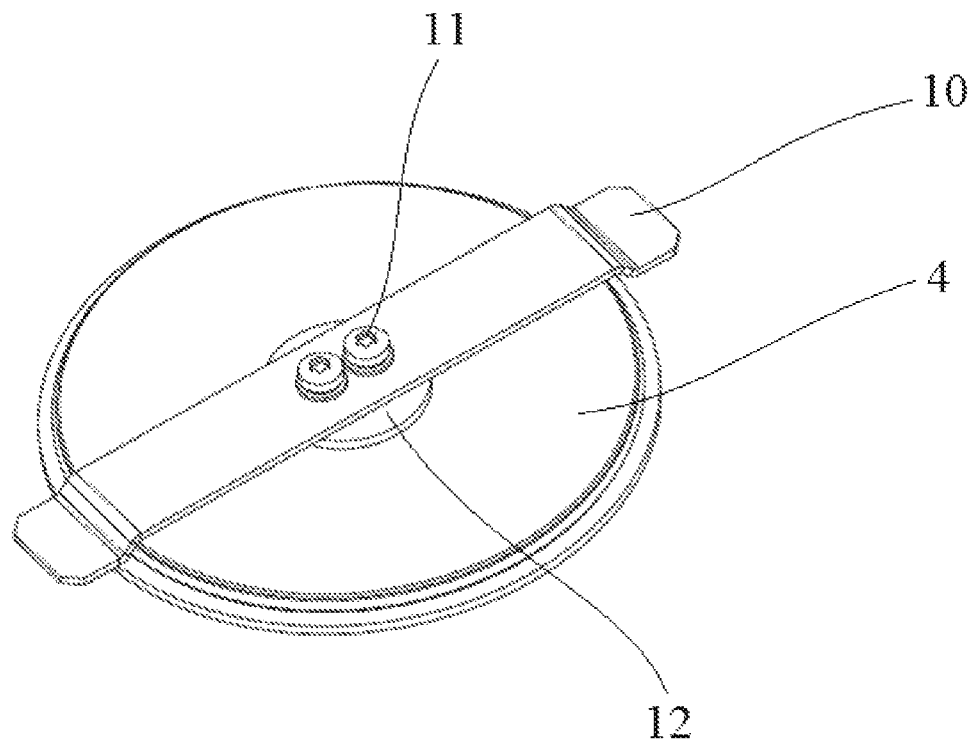
FIG. 2 depicts the vent of FIG. 1 from inside of a space.
Figure 3:
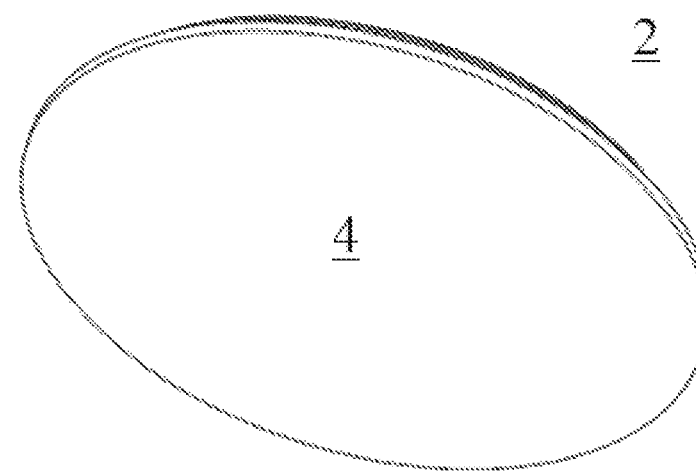
FIG. 3 depicts the vent of FIGS. 1 and 2 from outside of a wall closing a space.

In FIG. 1 the arrow 1 depicts a force caused by pressure inside a closed space. A wall of a closed space is depicted by reference number 2. This wall 2 comprises an opening 3 for a cover 4. In this embodiment the cover 4 is a circular disc and the opening 3 has a corresponding circular form. Circular form is advantageous because of ease of manufacture. Circular disc is also easy to fit in the opening. However, the cover 4 and the opening 3 may have any desired form, for example rectangular, oval, triangular or any desired shape. Any non-circular form has the benefit that its form prevents rotation of the cover 4 in the opening, but their form may be more difficult to manufacture. The outer edge of the cover is formed of two surfaces, a flange 5 and a sealing surface 6 for accommodating a seal element 7. The sealing element 7 is in this embodiment a standard O-ring that is mounted on a groove in the sealing surface 6. The opening 3 has a complementary surface 8 at its edge that faces towards the sealing surface 6 of the cover 4. The sealing element 7 is compressed between the sealing surface 6 of the cover 4 and the complementary surface 8 of the opening 3 forming a tight seal in a conventional manner. The O-ring is chosen according to the requirements of the required IP class and environmental stresses. It can be contemplated that other conventional sealing elements or sealing agents are used instead of O-ring, but the seal thus formed may not prevent opening of the cover at a predetermined pressure. In this embodiment the sealing surface 6 and the complementary surface 8 are perpendicular to the surfaces of the wall 1 and the outer surfaces of the cover 4. These surfaces may be slightly angled as long as the force providing the tightness of the seal has a direction different from the direction of the force that keeps the cover closed.

The flange 5 of the cover 4 extends outwards from the sealing surface 6 and the opening 3 has a corresponding groove 9. The flange 5 and the groove 9 are dimensioned so that the flange 5 and cover 4 can withstand possible hits or forces from outside without losing the tightness of the cover. They are also preferably dimensioned so that the surface of the cover 4 is flush with the surface of the wall 2. This provides neat appearance. However, it can be depicted that the flange is formed on top of the edge of the cover, for example as a circular ring or similar structure. If the sealing element has to be protected from tampering from outside, for example from high pressure water jets as required in IP69K, the flange forms a labyrinth seal with the edge of the opening 3 that protects the sealing element. If the labyrinth seal is not needed, the flange may be replace by claws or other holding elements or even an angular surface.

The cover 4 is locked into the opening 3 by a spring 10. The spring 10 is attached to the cover 4 on the opposite side to the flange 5 by two screws 11 that extend through the spring 10 to holes formed in the center of the cover 4. The cover has a reinforcement 12 at its center to accommodate the screws. The purpose of using two screws 11 is to prevent loosening of the screws 11 in a situation where the cover is rotated and also to secure that the cover stays closed should one of the screws fail. Instead of screws 11, any conventional fixing element or method may be used for securing the spring, for example rivets or clip-on fasteners.

In this embodiment the spring element 11 is a leaf spring that extends over the edges of the cover 4 and opening 3. The ends of the spring are bent away from the axle of the spring and positioned against the inner surface of the wall 2. The leaf spring is made of bent steel plate. Such a spring is easy and cheap to manufacture and the spring force can be adjusted to a desired level by changing the dimensions or possibly the material of the spring. Instead of one leaf spring, two or more springs may be used. The leaf spring may have a form of a spider having more than two aims extending from the center, or the spring may be a plate spring, or any suitable spring element that provides a locking force in the direction of the central axis of the cover and the opening. The spring element 11 a direction of action and the force causing the action presses the flange or other holding elements against the wall or edges of the opening so that the cover is held tightly secured in the opening. As the surface area of the cover is known, the required holding force of the spring can be calculated on basis of the desired relief pressure and surface area of the cover.

The parts of the explosion vent can be made of any material that fulfills the structural and environmental requirements set for its indented use.

Thus, while there have been shown and described and pointed out fundamental novel features of the invention as applied to a preferred embodiment thereof, it will be understood that various omissions and substitutions and changes in the form and details of the method and device may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

REFERENCE SIGNS LIST 1 arrow
2 wall
3 opening
4 cover
5 flange
6 sealing surface
7 sealing element
8 complementary surface
9 groove
10 spring
11 screw
12 reinforcment

The invention claimed is:

1. An explosion vent mounted to seal an opening formed on a wall, the vent comprising:
   a cover being dimensioned to fit on said opening and having a perimeter with an edge adapted to seal the cover against the opening with a sealing element, wherein:
   the cover has a first surface on its perimeter edge for accommodating the sealing element and a second surface extending outwards from the first surface and forming a flange having larger dimensions than the first surface,
   at least one leaf spring extends over the perimeter of the cover and is attached on a surface that is on an opposite side of the cover in relation to the flange, and wherein the leaf spring is configured to hold the cover in the opening and having a direction of spring action,
   opposite retaining surfaces in the opening are provided and the cover is acting against the spring action of element, and
   that the sealing element is positioned against the opening so that the sealing force is directed at least partially crosswise to the direction of the spring action of the spring element.

2. The explosion vent according to the claim 1, wherein the opening has a surface facing towards the center of the opening and the sealing element is mounted on the cover so that it causes a sealing force against that surface.

3. The explosion vent according to the claim 1, wherein the sealing force is directed at least partially crosswise, perpendicular, to the opening direction of the cover and the spring element is positioned to cause a force that is opposite to the opening direction of the cover.

4. The explosion vent according to claim 1, further comprising means for preventing the rotation of the cover in the opening.

* * * * *